April 21, 1970  J. G. BAKER  3,507,560

WIDE ANGLE SYMMETRICAL COPYING OBJECTIVE LENS SYSTEM

Filed Sept. 13, 1968

| E.F = 100.0 mm | | F.A. = 60° | | f/11.0 | |
|---|---|---|---|---|---|
| LENS | RADII | THICKNESS | SPACES | $n_d$ | $V_d$ |
| I | $R_1 = 20.06$ | $t_1 = 7.30$ | $S_1 = 1.03$ | 1.607 | 56.7 |
|  | $R_2 = 44.78$ |  |  |  |  |
| II | $R_3 = 20.72$ | $t_2 = 1.51$ | $S_2 = 6.90$ | 1.673 | 32.2 |
|  | $R_4 = 13.71$ |  |  |  |  |
| III | $R_5 = -13.71$ | $t_3 = 1.51$ | $S_3 = 6.90$ | 1.673 | 32.2 |
|  | $R_6 = -20.72$ |  |  |  |  |
| IV | $R_7 = -44.78$ | $t_4 = 7.30$ | $S_4 = 1.03$ | 1.607 | 56.7 |
|  | $R_8 = -20.06$ |  |  |  |  |

ALL SCALAR QUANTITIES GIVEN IN MILLIMETERS

INVENTOR.
James G. Baker
BY
Brown and Mikulka
and
Gerald L. Smith
ATTORNEYS

United States Patent Office 3,507,560
Patented Apr. 21, 1970

1

3,507,560
WIDE ANGLE SYMMETRICAL COPYING OBJECTIVE LENS SYSTEM
James G. Baker, Winchester, Mass., assignor to Polaroid Corporation, Cambridge, Mass., a corporation of Delaware
Filed Sept. 13, 1968, Ser. No. 759,666
Int. Cl. G02b 9/36
U.S. Cl. 350—221                                           19 Claims

ABSTRACT OF THE DISCLOSURE

An optical objective of symmetrical form for document copying and kindred uses. The objective has a wide field angle, good resolution and is fabricable from durable and clear glasses of moderate cost.

---

Figures 1, 2:
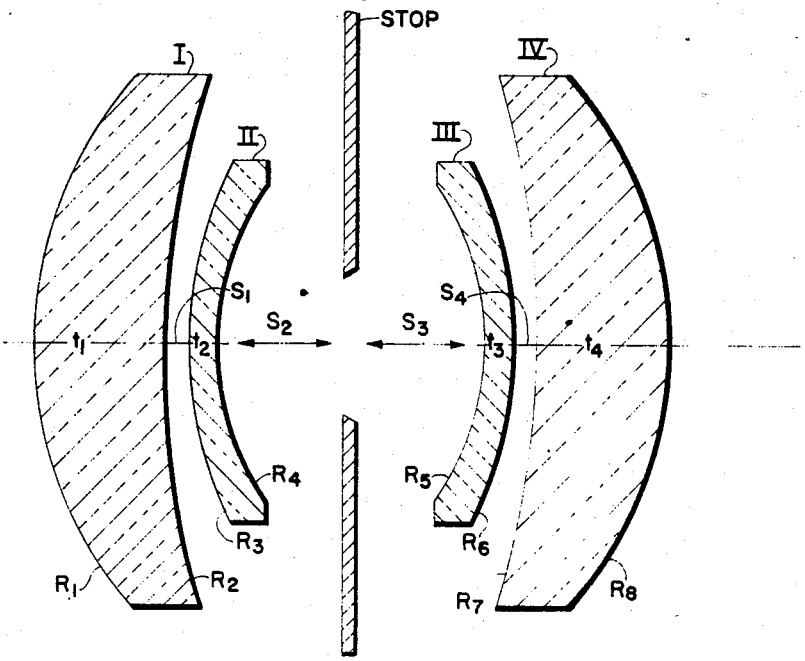

This invention relates to novel reproduction lenses such as those used in photocopying devices, and more particularly to a symmetrical four component lens having a relatively wide field angle.

The refinements and broadened capabilities evidenced in the technology of document copying have generated a corresponding interest in designs for improved and practical copying lens systems. Lenses used for this function must provide a relatively high quality of optical performance in image projection at natural dimension. Industrial product marketing considerations deem it desirable that the structures housing document copying systems be configured having a minimal size or bulk. As a consequence, the lenses selected for incorporation within the systems should function to provide a requisite unity magnification over a practical range of document sizes while confined by a somewhat restrictive allocation of operational space. This spatial restriction heightens a continuing emphasis for lens designs characterized in having somewhat wide field angles and shortened conjugate distances. The above suggested basic parameters of 1:1 magnification and wide field angle, however, have been recognized as representing an elusive design combination.

Document copying operations also require that the lenses incorporated within the systems retain a relatively high resolution or image forming quality over the broad field angles projected. In addition to good resolution, it is desirable that the final lens design represent a product which may be produced at acceptably low unit costs. To provide for requisite production economies, the elements forming the lens should be configured having mild surface curvatures. Additionally, the glass stock from which the elements of the lenses are fabricated should be readily available at acceptably low cost. Generally, this latter materials cost consideration will be resolved through attention to the design selection of glasses of medium refractive index.

A further factor to be weighed and considered in the design of the subject lenses concerns their operational environment. In general practice, the lenses may be inserted within an enclosure also containing one or more chemical processing stations in addition to projection lamps and thermal drying units. As a consequence, the glasses from which the lenses are fashioned must be sufficiently durable for resisting possibly corrosive vapors and thermally induced stresses.

The present invention is addressed to the design of a lens suited to the optical performance criteria of document copying applications. Formed from durable and clear but relatively inexpensive glass stock of medium refractive index, the lens is suitable for use in complement with the environments encountered within photocopying machines. As an additional feature, the invention provides a lens for document copying applications having a relatively wide field angle while being characterized in incorporating desirably shallow curvatures at the surfaces of its components.

As another object, the invention provides an objective lens which is symmetrical in form and which functions at unit magnification to avail a high quality of resolution. This improved optical performance of the lens is provided without resort to more costly manufacturing techniques or to more expensive materials.

Another object of the invention is to provide a novel lens of the symmetrical variety suited for installation in a broad variety of copying devices and the like which derives adequate field angle coverage at 1:1 magnification while affording good image resolution at its designated field angle limitations. By virtue of its symmetrical form, the objective lens of the invention provides distortion free reproduction at natural scale. The inventive lens additionally provides for good color magnification.

Further objects and advantages will be found in the details of construction and arrangement of components by reference to the specification herebelow taken in connection with the accompanying drawing wherein:

FIGURE 1 illustrates sections through and containing the optical axis of the objective according to the constructional examples of the invention; and FIGURE 2 is a table showing the constructional data for an objective system according to the presently preferred embodiment of the invention.

Referring to FIGURE 1, the lens system of the invention is shown to comprise a symmetrical objective having four axially aligned single element components identified at I, II, III and IV. In accord with the convention of symmetrical lens configurations, these components are disposed within two identical groupings spaced upon opposite sides of a centrally located air space. This air space will be observed to be of adequate length for accommodating a diaphragm or stop and shutter mechanism as is depicted only generally in the figure. The symmetrical relationship extant between the two component groupings is revealed in the identical dimensions of the component counterparts at each side of the stop. Additionally, these mirror image duplicate elements will be seen to be formed of the same materials. The drawing further reveals that all of the elements are concave towards the centrally disposed air space.

Numerical data for the embodiment of the symmetrical objective lens system as above described in connection with FIGURE 1 and as additionally presented in FIGURE 2, are given in the following table in which $R_1$, $R_2$ . . . designate the radii of curvature of the individual surfaces of the components of the objective; $t_1$, $t_2$ . . . designate the axial thickness of the individual elements of the objective; and $S_1$, $S_2$ . . . designate the axial air separations between the components of the system.

The table also provides refractive indices $n_d$ for the $d$-line of the spectrum and the Abbe numbers $V_d$ of the materials from which the various elements of the objective are made. The dimensions in the table are given in terms of millimeters.

TABLE I
[F=100 mm.; f/11.0; F.A. 60°]

| Lens | Radii | Spaces and Thicknesses | $n_d$ | $V_d$ |
|---|---|---|---|---|
| I | $R_1=+20.06$ | $t_1=7.30$ | 1.607 | 56.7 |
|   | $R_2=+44.78$ | $S_1=1.03$ | | |
| II | $R_3=+20.72$ | $t_2=1.51$ | 1.673 | 32.2 |
|    | $R_4=+13.71$ | $S_2=6.90$ | | |
| Stop | | $S_3=6.90$ | | |
| III | $R_5=-13.71$ | $t_3=1.51$ | 1.673 | 32.2 |
|     | $R_6=-20.72$ | $S_4=1.03$ | | |
| IV | $R_7=-44.78$ | $t_4=7.30$ | 1.607 | 56.7 |
|    | $R_8=-20.06$ | | | |

A lens designed in accordance with the optical date listed in the above table will be found to have many significant features. For example, the lens is formed of inexpensive durable and very clear glass types of medium index. The lens defines a medium wide angle field of 60° at unit magnification. This field coverage is achieved while the radii of the elements define desirably mild surface curvatures. The lens has been found to provide good resolution out to the periphery defined by its designated field angle. For instance, when dimensioned for 1:1 magnification of a conventional 11" x 14" document format, the lens is capable of providing a resolution ranging from 40 lines/mm. to 57 lines/mm. At unit magnification, the object axial distance for the lens of the example is 180.61 mm. for light transmitted at a wavelength of 5876 angstrom units. For average spectral or mean color transmission, this object axial distance becomes 180.46 mm.

Additional examples of lens systems capable of providing good performance at unity magnification and at a field coverage of 60° are set forth in Tables II through XIII. Having constructional data evidencing a considerable uniformity with that of Table I, the lens systems provide good resolution while retaining mild surface curvatures. The tables to follow are drawn having the same symbolism and scalar arrangement as provided in connection with Table I above and with FIGURE 1.

TABLE II
[F=100 mm; f/11.0; F.A. 60°]

| Lens | Radii | Spaces and Thicknesses | $n_d$ | $V_d$ |
|---|---|---|---|---|
| I | $R_1=+20.10$ | $t_1=7.19$ | 1.589 | 61.3 |
|   | $R_2=+44.86$ | $S_1=1.03$ | | |
| II | $R_3=+20.65$ | $t_2=1.78$ | 1.646 | 34.1 |
|    | $R_4=+13.67$ | $S_2=7.15$ | | |
| Stop | | $S_3=7.15$ | | |
| III | $R_5=-13.67$ | $t_3=1.78$ | 1.646 | 34.1 |
|     | $R_6=-20.65$ | $S_4=1.03$ | | |
| IV | $R_7=-44.86$ | $t_4=7.19$ | 1.589 | 61.3 |
|    | $R_8=-20.10$ | | | |

Note.—Object distance at 1:1 magnification: 179.92 mm.

TABLE III
[F=100 mm.; f/11.0; F.A. 60°]

| Lens | Radii | Spaces and Thicknesses | $n_d$ | $V_d$ |
|---|---|---|---|---|
| I | $R_1=+20.11$ | $t_1=7.05$ | 1.589 | 61.3 |
|   | $R_2=+44.56$ | $S_1=1.03$ | | |
| II | $R_3=+20.57$ | $t_2=1.85$ | 1.648 | 33.9 |
|    | $R_4=+13.68$ | $S_2=7.24$ | | |
| Stop | | $S_3=7.24$ | | |
| III | $R_5=-13.68$ | $t_3=1.85$ | 1.648 | 33.9 |
|     | $R_6=-20.57$ | $S_4=1.03$ | | |
| IV | $R_7=-44.56$ | $t_4=7.05$ | 1.589 | 61.3 |
|    | $R_8=-20.11$ | | | |

Note.—Object distance at 1:1 magnification: 179.86 mm.

TABLE IV
[F=100 mm.; f/11.0; F.A. 60°]

| Lens | Radii | Spaces and Thicknesses | $n_d$ | $V_d$ |
|---|---|---|---|---|
| I | $R_1=+20.01$ | $t_1=7.88$ | 1.583 | 59.5 |
|   | $R_2=+47.71$ | $S_1=1.03$ | | |
| II | $R_3=+20.99$ | $t_2=1.59$ | 1.648 | 33.8 |
|    | $R_4=+13.59$ | $S_2=6.60$ | | |
| Stop | | $S_3=6.60$ | | |
| III | $R_5=-13.59$ | $t_3=1.59$ | 1.648 | 33.8 |
|     | $R_6=-20.99$ | $S_4=1.03$ | | |
| IV | $R_7=-47.71$ | $t_4=7.88$ | 1.583 | 59.5 |
|    | $R_8=-20.01$ | | | |

Note.—Object distance at 1:1 magnification: 180.17 mm.

TABLE V
[F=100 mm.; f/11.0; F.A. 60°]

| Lens | Radii | Spaces and Thicknesses | $n_d$ | $V_d$ |
|---|---|---|---|---|
| I | $R_1=+19.90$ | $t_1=7.53$ | 1.518 | 65.1 |
|   | $R_2=+52.28$ | $S_1=1.00$ | | |
| II | $R_3=+20.10$ | $t_2=2.77$ | 1.654 | 33.7 |
|    | $R_4=+13.27$ | $S_2=6.78$ | | |
| Stop | | $S_3=6.78$ | | |
| III | $R_5=-13.27$ | $t_3=2.77$ | 1.654 | 33.7 |
|     | $R_6=-20.10$ | $S_4=1.00$ | | |
| IV | $R_7=-52.28$ | $t_4=7.53$ | 1.518 | 65.1 |
|    | $R_8=-19.90$ | | | |

Note.—Object distance at 1:1 magnification: 178.50 mm.

TABLE VI
[F=100 mm.; f/11.0; F.A. 60°]

| Lens | Radii | Spaces and Thicknesses | $n_d$ | $V_d$ |
|---|---|---|---|---|
| I | $R_1=+19.97$ | $t_1=7.60$ | 1.564 | 60.8 |
|   | $R_2=+49.02$ | $S_1=1.02$ | | |
| II | $R_3=+20.72$ | $t_2=2.03$ | 1.654 | 33.7 |
|    | $R_4=+13.50$ | $S_2=6.67$ | | |
| Stop | | $S_3=6.67$ | | |
| III | $R_5=-13.50$ | $t_3=2.03$ | 1.654 | 33.7 |
|     | $R_6=-20.72$ | $S_4=1.02$ | | |
| IV | $R_7=-49.02$ | $t_4=7.60$ | 1.564 | 60.8 |
|    | $R_8=-19.97$ | | | |

Note.—Object distance at 1:1 magnification: 179.74 mm.

TABLE VII
[F=100 mm.; f/11.0; F.A. 60°]

| Lens | Radii | Spaces and Thicknesses | $n_d$ | $V_d$ |
|---|---|---|---|---|
| I | $R_1=+20.91$ | $t_1=8.48$ | 1.564 | 60.8 |
|   | $R_2=+56.18$ | $S_1=1.01$ | | |
| II | $R_3=+21.98$ | $t_2=2.19$ | 1.654 | 33.7 |
|    | $R_4=+13.96$ | $S_2=6.45$ | | |
| Stop | | $S_3=6.45$ | | |
| III | $R_5=-13.96$ | $t_3=2.19$ | 1.654 | 33.7 |
|     | $R_6=-21.98$ | $S_4=1.01$ | | |
| IV | $R_7=-56.18$ | $t_4=8.48$ | 1.564 | 60.8 |
|    | $R_8=-20.91$ | | | |

NOTE.—Object distance at 1:1 magnification: 179.06 mm.

TABLE VIII
[F=100 mm.; f/11.0; F.A. 60°]

| Lens | Radii | Spaces and Thicknesses | $n_d$ | $V_d$ |
|---|---|---|---|---|
| I | $R_1=+20.99$ | $t_1=8.74$ | 1.564 | 60.8 |
|   | $R_2=+55.33$ | $S_1=0.15$ | | |
| II | $R_3=+22.21$ | $t_2=2.31$ | 1.654 | 33.7 |
|    | $R_4=+14.13$ | $S_2=6.45$ | | |
| Stop | | $S_3=6.45$ | | |
| III | $R_5=-14.13$ | $t_3=2.31$ | 1.654 | 33.7 |
|     | $R_6=-22.21$ | $S_4=0.15$ | | |
| IV | $R_7=-55.33$ | $t_4=8.74$ | 1.564 | 60.8 |
|    | $R_8=-20.99$ | | | |

NOTE.—Object distance at 1:1 magnification: 180.10 mm.

TABLE IX
[F=100 mm.; f/11.0; F.A. 60°]

| Lens | Radii | Spaces and Thicknesses | $n_d$ | $V_d$ |
|---|---|---|---|---|
| I | $R_1=+20.10$ | $t_1=6.76$ | 1.569 | 63.1 |
|   | $R_2=+45.58$ | $S_1=1.02$ | | |
| II | $R_3=+20.26$ | $t_2=2.28$ | 1.654 | 33.7 |
|    | $R_4=+13.58$ | $S_2=7.40$ | | |
| Stop | | $S_3=7.40$ | | |
| III | $R_5=-13.58$ | $t_3=2.28$ | 1.654 | 33.7 |
|     | $R_6=-20.26$ | $S_4=1.02$ | | |
| IV | $R_7=-45.58$ | $t_4=6.76$ | 1.569 | 63.1 |
|    | $R_8=-20.10$ | | | |

NOTE.—Object distance at 1:1 magnification: 179.31 mm.

TABLE X
[F=100 mm.; f/11.0; F.A. 60°]

| Lens | Radii | Spaces and Thicknesses | $n_d$ | $V_d$ |
|---|---|---|---|---|
| I | $R_1=+20.01$ | $t_1=7.73$ | 1.583 | 59.5 |
|   | $R_2=+47.55$ | $S_1=1.03$ | | |
| II | $R_3=+20.90$ | $t_2=1.66$ | 1.654 | 33.7 |
|    | $R_4=+13.59$ | $S_2=6.65$ | | |
| Stop | | $S_3=6.65$ | | |
| III | $R_5=-13.59$ | $t_3=1.66$ | 1.654 | 33.7 |
|     | $R_6=-20.90$ | $S_4=1.03$ | | |
| IV | $R_7=-47.55$ | $t_4=7.73$ | 1.583 | 59.5 |
|    | $R_8=-20.01$ | | | |

NOTE.—Object distance at 1:1 magnification: 180.16 mm.

TABLE XI
[F=100 mm.; f/11.0; F.A. 60°]

| Lens | Radii | Spaces and Thicknesses | $n_d$ | $V_d$ |
|---|---|---|---|---|
| I | $R_1=+20.03$ | $t_1=7.52$ | 1.592 | 58.3 |
|   | $R_2=+46.58$ | $S_1=1.03$ | | |
| II | $R_3=+20.79$ | $t_2=1.65$ | 1.667 | 33.0 |
|    | $R_4=+13.63$ | $S_2=6.74$ | | |
| Stop | | $S_3=6.74$ | | |
| III | $R_5=-13.63$ | $t_3=1.65$ | 1.667 | 33.0 |
|     | $R_6=-20.79$ | $S_4=1.03$ | | |
| IV | $R_7=-46.58$ | $t_4=7.52$ | 1.592 | 58.3 |
|    | $R_8=-20.03$ | | | |

NOTE.—Object distance at 1:1 magnification: 180.33 mm.

TABLE XII
[F=100 mm.; f/11.0; F.A. 60°]

| Lens | Radii | Spaces and Thicknesses | $n_d$ | $V_d$ |
|---|---|---|---|---|
| I | $R_1=+20.14$ | $t_1=6.56$ | 1.607 | 56.7 |
|   | $R_2=+43.31$ | $S_1=1.04$ | | |
| II | $R_3=+20.28$ | $t_2=1.86$ | 1.689 | 31.2 |
|    | $R_4=+13.75$ | $S_2=7.39$ | | |
| Stop | | $S_3=7.39$ | | |
| III | $R_5=-13.75$ | $t_3=1.86$ | 1.689 | 31.2 |
|     | $R_6=-20.28$ | $S_4=1.04$ | | |
| IV | $R_7=-43.31$ | $t_4=6.56$ | 1.607 | 56.7 |
|    | $R_8=-20.14$ | | | |

NOTE.—Object distance at 1:1 magnification: 180.26 mm.

TABLE XIII
[=100 mm.; f/11.0; F.A. 60°]

| Lens | Radii | Spaces and Thicknesses | $n_d$ | $V_d$ |
|---|---|---|---|---|
| I | $R_1=+20.13$ | $t_1=6.76$ | 1.622 | 53.2 |
|   | $R_2=+43.21$ | $S_1=1.04$ | | |
| II | $R_3=+20.46$ | $t_2=1.59$ | 1.699 | 30.1 |
|    | $R_4=+13.80$ | $S_2=7.16$ | | |
| Stop | | $S_3=7.16$ | | |
| III | $R_5=-13.80$ | $t_3=1.59$ | 1.699 | 30.1 |
|     | $R_6=-20.46$ | $S_4=1.04$ | | |
| IV | $R_7=-43.21$ | $t_4=6.76$ | 1.622 | 53.2 |
|    | $R_8=-20.13$ | | | |

Note.—Object distance at 1:1 magnification: 180.78 mm.

The distinguishing field coverage provided by the above described embodiments becomes more apparent when viewed comparatively with a second collection of closely related examples of the symmetrical lens system. Constructional data for these examples are provided in the tabulations to follow. Tables XIV through XVIII are drawn having the same symbolism and scalar arrangement as provided in connection with Tables I to XIII above and with FIGURE 1.

TABLE XIV
[F=100 mm.; f/100; F.A. 60°]

| Lens | Radii | Spaces and Thicknesses | $n_d$ | $V_d$ |
|---|---|---|---|---|
| I | $R_1=+20.00$ | $t_1=7.68$ | 1.607 | 56.7 |
|  | $R_2=+44.68$ | $S_1=0.84$ |  |  |
| II | $R_3=+20.68$ | $t_2=1.50$ | 1.673 | 32.2 |
|  | $R_4=+13.59$ | $S_2=6.68$ |  |  |
| Stop |  | $S_3=6.68$ |  |  |
| III | $R_5=-13.59$ | $t_3=1.50$ | 1.673 | 32.2 |
|  | $R_6=-20.61$ | $S_4=0.84$ |  |  |
| IV | $R_7=-44.68$ | $t_4=7.68$ | 1.607 | 56.7 |
|  | $R_8=-20.00$ |  |  |  |

Note.—Object distance at 1:1 magnification: 180.48 mm.

The examples set forth in Tables XV through XVIII will be recognized in having constructional data incorporating curvature, thickness and axial spacing somewhat closely related to the earlier examples defined in Tables I through XIII. However, the lens system of Tables XV to XVIII function to evolve normal field coverage at a field angle of 45°. The examples provide good resolution over this entire field. Their relatively lower values for indices of refraction afford advantageously lowered materials costs.

TABLE XV
[F=100 mm.; f/11.0; F.A. 45°]

| Lens | Radii | Spaces and Thicknesses | $n_d$ | $V_d$ |
|---|---|---|---|---|
| I | $R_1=+19.76$ | $t_1=8.81$ | 1.517 | 64.2 |
|  | $R_2=+64.39$ | $S_1=1.00$ |  |  |
| II | $R_3=+21.96$ | $t_2=2.40$ | 1.620 | 36.4 |
|  | $R_4=+13.25$ | $S_2=5.58$ |  |  |
| Stop |  | $S_3=5.58$ |  |  |
| III | $R_5=-13.25$ | $t_3=2.40$ | 1.620 | 36.4 |
|  | $R_6=-21.96$ | $S_4=1.00$ |  |  |
| IV | $R_7=-64.39$ | $t_4=8.61$ | 1.517 | 64.2 |
|  | $R_8=-19.76$ |  |  |  |

Note.—Object distance at 1:1 magnification: 179.64 mm.

TABLE XVI
[F=100 mm.; f/11.0; F.A. 45°]

| Lens | Radii | Spaces and Thicknesses | $n_d$ | $V_d$ |
|---|---|---|---|---|
| I | $R_1=+19.95$ | $t_1=8.69$ | 1.522 | 59.5 |
|  | $R_2=+101.1$ | $S_1=1.01$ |  |  |
| II | $R_3=+25.01$ | $t_2=2.36$ | 1.620 | 36.4 |
|  | $R_4=+13.37$ | $S_2=4.37$ |  |  |
| Stop |  | $S_3=4.37$ |  |  |
| III | $R_5=-13.37$ | $t_3=2.36$ | 1.620 | 36.4 |
|  | $R_6=-25.01$ | $S_4=1.01$ |  |  |
| IV | $R_7=-101.1$ | $t_4=8.69$ | 1.522 | 59.5 |
|  | $R_8=-19.95$ |  |  |  |

Note.—Object distance at 1:1 magnification: 181.82 mm.

TABLE XVII
[F=100 mm.; f/11.0; F.A. 45°]

| Lens | Radii | Spaces and Thicknesses | $n_d$ | $V_d$ |
|---|---|---|---|---|
| I | $R_1=+19.92$ | $t_1=9.42$ | 1.564 | 60.8 |
|  | $R_2=+58.10$ | $S_1=1.01$ |  |  |
| II | $R_3=+22.38$ | $t_2=1.19$ | 1.620 | 36.4 |
|  | $R_4=+13.42$ | $S_2=5.56$ |  |  |
| Stop |  | $S_3=5.56$ |  |  |
| III | $R_5=-13.42$ | $t_3=1.19$ | 1.620 | 36.4 |
|  | $R_6=-22.38$ | $S_4=1.01$ |  |  |
| IV | $R_7=-58.10$ | $t_4=9.42$ | 1.564 | 60.8 |
|  | $R_8=-19.92$ |  |  |  |

Note.—Object distance at 1:1 magnification: 180.38 mm.

TABLE XVIII
[F=100 mm.; f/11.0; F.A. 45°]

| Lens | Radii | Spaces and Thicknesses | $n_d$ | $V_d$ |
|---|---|---|---|---|
| I | $R_1=+20.27$ | $t_1=9.02$ | 1.569 | 56.1 |
|  | $R_2=+100.7$ | $S_1=1.03$ |  |  |
| II | $R_3=+26.92$ | $t_2=1.30$ | 1.620 | 36.4 |
|  | $R_4=+13.66$ | $S_2=4.20$ |  |  |
| Stop |  | $S_3=4.20$ |  |  |
| III | $R_5=-13.66$ | $t_3=1.30$ | 1.620 | 36.4 |
|  | $R_6=-26.92$ | $S_4=1.03$ |  |  |
| IV | $R_7=-100.7$ | $t_4=9.02$ | 1.569 | 56.1 |
|  | $R_8=-20.27$ |  |  |  |

Note.—Object distance at 1:1 magnification: 183.22 mm.

The symmetrical lens system of the invention will be observed to incorporate dimensional parameters as given in the expressions below wherein F denotes equivalent focal length and the remaining symbols have the same meanings as set forth heretofore. With respect to radii $R_1$ to $R_8$, these parameters fall within the following range of values:

$$0.1976F \leq R_1 = -R_8 \leq 0.2099F$$

$$1.011F \geq R_2 = -R_7 \geq 0.4321F$$

$$0.2692F \geq R_3 = -R_6 \geq 0.2010F$$

$$0.1413F \geq R_4 = -R_5 \geq 0.1325F$$

With respect to axial thickness $t_1$ to $t_4$, the parameters fall within the following range of values:

$$0.0656F \leq t_1 = t_4 \leq 0.0942F$$

$$0.0119F \leq t_2 = t_3 \leq 0.0277F$$

With respect to axial spacings $S_1$ to $S_4$, the following range of values is obtained:

$$0.0104F \geq S_1 = S_4 \geq 0.0015F$$

$$0.0740F \geq S_2 = S_3 \geq 0.0420F$$

In all forms of the invention, the lens system will operate at f/22 on either side for 1:1 magnification. Additionally, the refractive index $n_d$ and Abbe number $V_d$ fall within the following relationships:

$$1.517 \leq n_d(I) = n_d(IV) \leq 1.622$$
$$1.620 \leq n_d(II) = n_d(III) \leq 1.699$$
$$53.2 \leq V_d(I) = V_d(IV) \leq 65.1$$
$$30.1 \leq V_d(II) = V_d(III) \leq 36.4$$

Although exemplary forms of the invention have been shown and described in detail, it will be understood that other forms are possible and changes may be made in the specific details thereof without departing from the spirit of the invention.

I claim:

1. An optical objective of symmetrical form consisting of a pair of exterior meniscus lenses and a pair of interior meniscus lenses located therebetween on opposite sides of a central air space, all of said lenses being concave thereto and having constructional parameters as set forth in the expressions given herebelow wherein:

$R_1$ to $R_8$ represent the radii of the successive lens surfaces;

$t_1$ to $t_4$ represent the axial thickness of the respective lenses;

$S_1$ to $S_4$ represent the internal axial spacing between the lenses, $S_2$ and $S_3$ denote the air space located nearest to the said diaphragm;

$n_d$ and $V_d$ represent, respectively, the refractive index and Abbe number of the lens materials, the designations (I), (II), (III) and (IV) signifying the successive lens elements I to IV; and F designates the equivalent focal length of the objective:

$$0.1976F \leq R_1 = -R_8 \leq 0.2099F$$
$$1.011F \geq R_2 = -R_7 \geq 0.4321F$$
$$0.2692F \geq R_3 = -R_6 \geq 0.2010F$$
$$0.1413F \geq R_4 = -R_5 \geq 0.1325F$$
$$0.0656F \leq t_1 = t_4 \leq 0.0942F$$
$$0.0119F \leq t_2 = t_3 \leq 0.0277F$$
$$0.0104F \geq S_1 = S_4 0.0015F$$
$$0.0740F \geq S_2 = S_3 \geq 0.0420F$$
$$1.517 \leq n_d(I) = n_d(IV) \leq 1.622$$
$$1.620 \leq n_d(II) = n_d(III) \leq 1.699$$
$$53.2 \geq V_d(I) = V_d(IV) \leq 65.1$$
$$30.1 \leq V_d(II) = V_d(III) \leq 36.4$$

2. The optical objective of claim 1 having the following constructional characteristics:

| Lens | Radii | Spaces and Thicknesses | $n_d$ | $V_d$ |
|---|---|---|---|---|
| (I) | $R_1=+0.2006F$ | $t_1=0.0730F$ | 1.607 | 56.7 |
|  | $R_2=+0.4478F$ | $S_1=0.0103F$ |  |  |
| (II) | $R_3=+0.2072F$ | $t_2=0.0151F$ | 1.673 | 32.2 |
|  | $R_4=+0.1371F$ | $S_2=0.0690F$ |  |  |
|  |  | $S_3=0.0690F$ |  |  |
| (III) | $R_5=-0.1371F$ | $t_3=0.0151F$ | 1.673 | 32.2 |
|  | $R_6=-0.2072F$ | $S_4=0.0103F$ |  |  |
| (IV) | $R_7=-0.4478F$ | $t_4=0.0730F$ | 1.607 | 56.7 |
|  | $R_8=-0.2006F$ |  |  |  |

3. The optical objective of claim 1 having the following constructional characteristics:

| Lens | Radii | Spaces and Thicknesses | $n_d$ | $V_d$ |
|---|---|---|---|---|
| (I) | $R_1=+0.2010F$ | $t_1=0.0719F$ | 1.589 | 61.3 |
|  | $R_2=+0.4486F$ | $S_1=0.0103F$ |  |  |
| (II) | $R_3=+0.2065F$ | $t_2=0.0178F$ | 1.646 | 34.1 |
|  | $R_4=+0.1367F$ | $S_2=0.0715F$ |  |  |
|  |  | $S_3=0.0715F$ |  |  |
| (III) | $R_5=-0.1367F$ | $t_3=0.0178F$ | 1.646 | 34.1 |
|  | $R_6=-0.2065F$ | $S_4=0.0103F$ |  |  |
| (IV) | $R_7=-0.4486F$ | $t_4=0.0719F$ | 1.589 | 61.3 |
|  | $R_8=-0.2010F$ |  |  |  |

4. The optical objective of claim 1 having the following constructional characteristics:

| Lens | Radii | Spaces and Thicknesses | $n_d$ | $V_d$ |
|---|---|---|---|---|
| (I) | $R_1=+0.2011F$ | $t_1=0.0705F$ | 1.589 | 61.3 |
|  | $R_2=+0.4456F$ | $S_1=0.0103F$ |  |  |
| (II) | $R_3=+0.2057F$ | $t_2=0.0185F$ | 1.648 | 33.9 |
|  | $R_4=+0.1368F$ | $S_2=0.0724F$ |  |  |
|  |  | $S_3=0.0724F$ |  |  |
| (III) | $R_5=-0.1368F$ | $t_3=0.0185F$ | 1.648 | 33.9 |
|  | $R_6=-0.2057F$ | $S_4=0.0103F$ |  |  |
| (IV) | $R_7=-0.4456F$ | $t_4=0.0705F$ | 1.589 | 61.3 |
|  | $R_8=-0.2011F$ |  |  |  |

5. The optical objective of claim 1 having the following constructional characteristics:

| Lens | Radii | Spaces and Thicknesses | $n_d$ | $V_d$ |
|---|---|---|---|---|
| (I) | $R_1=+0.2001F$ | $t_1=0.0788F$ | 1.583 | 59.5 |
|  | $R_2=+0.4771F$ | $S_1=0.0103F$ |  |  |
| (II) | $R_3=+0.2099F$ | $t_2=0.0159F$ | 1.648 | 33.8 |
|  | $R_4=+0.1359F$ | $S_2=0.0660F$ |  |  |
|  |  | $S_3=0.0660F$ |  |  |
| (III) | $R_5=-0.1359F$ | $t_3=0.0159F$ | 1.648 | 33.8 |
|  | $R_6=-0.2099F$ | $S_4=0.0103F$ |  |  |
| (IV) | $R_7=-0.4771F$ | $t_4=0.0788F$ | 1.583 | 59.5 |
|  | $R_8=-0.2001F$ |  |  |  |

6. The optical objective of claim 1 having the following constructional characteristics:

| Lens | Radii | Spaces and Thicknesses | $n_d$ | $V_d$ |
|---|---|---|---|---|
| (I) | $R_1=+0.1990F$ | $t_1=0.0753F$ | 1.518 | 65.1 |
|  | $R_2=+0.5228F$ | $S_1=0.0100F$ |  |  |
| (II) | $R_3=+0.2010F$ | $t_2=0.0277F$ | 1.654 | 33.7 |
|  | $R_4=+0.1327F$ | $S_2=0.0678F$ |  |  |
|  |  | $S_3=0.0678F$ |  |  |
| (III) | $R_5=-0.1327F$ | $t_3=0.0277F$ | 1.654 | 33.7 |
|  | $R_6=-0.2010F$ | $S_4=0.0100F$ |  |  |
| (IV) | $R_7=-0.5228F$ | $t_4=0.0753F$ | 1.518 | 65.1 |
|  | $R_8=-0.1990F$ |  |  |  |

7. The optical objective of claim 1 having the following constructional characteristics:

| Lens | Radii | Spaces and Thicknesses | $n_d$ | $V_d$ |
|---|---|---|---|---|
| (I) | $R_1 = +0.1997F$<br>$R_2 = +0.4902F$ | $t_1 = 0.0760F$<br>$S_1 = 0.0102F$ | 1.564 | 60.8 |
| (II) | $R_3 = +0.2072F$<br>$R_4 = +0.1350F$ | $t_2 = 0.0203F$<br>$S_2 = 0.0667F$<br>$S_3 = 0.0667F$ | 1.654 | 33.7 |
| (III) | $R_5 = -0.1350F$<br>$R_6 = -0.2072F$ | $t_3 = 0.0203F$<br>$S_4 = 0.0102F$ | 1.654 | 33.7 |
| (IV) | $R_7 = -0.4902F$<br>$R_8 = -0.1997F$ | $t_4 = 0.0760F$ | 1.564 | 60.8 |

8. The optical objective of claim 1 having the following constructional characteristics:

| Lens | Radii | Spaces and Thicknesses | $n_d$ | $V_d$ |
|---|---|---|---|---|
| (I) | $R_1 = +0.2091F$<br>$R_2 = +0.5618F$ | $t_1 = 0.0848F$<br>$S_1 = 0.0101F$ | 1.564 | 60.8 |
| (II) | $R_3 = +0.2198F$<br>$R_4 = +0.1396F$ | $t_2 = 0.0219F$<br>$S_2 = 0.0645F$<br>$S_3 = 0.0645F$ | 1.654 | 33.7 |
| (III) | $R_5 = -0.1396F$<br>$R_6 = -0.2198F$ | $t_3 = 0.0219F$<br>$S_4 = 0.0101F$ | 1.654 | 33.7 |
| (IV) | $R_7 = -0.5618F$<br>$R_8 = -0.2091F$ | $t_4 = 0.0848F$ | 1.564 | 60.8 |

9. The optical objective of claim 1 having the following constructional characteristics:

| Lens | Radii | Spaces and Thicknesses | $n_d$ | $V_d$ |
|---|---|---|---|---|
| (I) | $R_1 = +0.2099F$<br>$R_2 = +0.5533F$ | $t_1 = 0.0874F$<br>$S_1 = 0.0015F$ | 1.564 | 60.8 |
| (II) | $R_3 = +0.2221F$<br>$R_4 = +0.1413F$ | $t_2 = 0.1413F$<br>$S_2 = 0.0645F$<br>$S_3 = 0.0645F$ | 1.654 | 33.7 |
| (III) | $R_5 = -0.1413F$<br>$R_6 = -0.2221F$ | $t_3 = 0.0231F$<br>$S_4 = 0.0015F$ | 1.654 | 33.7 |
| (IV) | $R_7 = -0.5533F$<br>$R_8 = -0.2099F$ | $t_4 = 0.0874F$ | 1.564 | 60.0 |

10. The optical objective of claim 1 having the following constructional characteristics:

| Lens | Radii | Spaces and Thicknesses | $n_d$ | $V_d$ |
|---|---|---|---|---|
| (I) | $R_1 = +0.2010F$<br>$R_2 = +0.4558F$ | $t_1 = 0.0676F$<br>$S_1 = 0.0102F$ | 1.569 | 63.1 |
| (II) | $R_3 = +0.2026F$<br>$R_4 = +0.1358F$ | $t_2 = 0.0228F$<br>$S_2 = 0.0740F$<br>$S_3 = 0.0740F$ | 1.654 | 33.7 |
| (III) | $R_5 = -0.1358F$<br>$R_6 = -0.2026F$ | $t_3 = 0.0228F$<br>$S_4 = 0.0102F$ | 1.654 | 33.7 |
| (IV) | $R_7 = -0.4558F$<br>$R_8 = -0.2010F$ | $t_4 = 0.0676F$ | 1.569 | 63.1 |

11. The optical objective of claim 1 having the following constructional characteristics:

| Lens | Radii | Spaces and Thicknesses | $n_d$ | $V_d$ |
|---|---|---|---|---|
| (I) | $R_1 = +0.2001F$<br>$R_2 = +0.4755F$ | $t_1 = 0.0773F$<br>$S_1 = 0.0103F$ | 1.583 | 59.5 |
| (II) | $R_3 = +0.2090F$<br>$R_4 = +0.1359F$ | $t_2 = 0.0166F$<br>$S_2 = 0.0665F$<br>$S_3 = 0.0665F$ | 1.654 | 33.7 |
| (III) | $R_5 = -0.1359F$<br>$R_6 = -0.2090F$ | $t_3 = 0.0166F$<br>$S_4 = 0.0103F$ | 1.654 | 33.7 |
| (IV) | $R_7 = -0.4755F$<br>$R_8 = -0.2001F$ | $t_4 = 0.0773F$ | 1.583 | 59.5 |

12. The optical objective of claim 1 having the following constructional characteristics:

| Lens | Radii | Spaces and Thicknesses | $n_d$ | $V_d$ |
|---|---|---|---|---|
| (I) | $R_1 = +0.2003F$<br>$R_2 = +0.4658F$ | $t_1 = 0.0725F$<br>$S_1 = 0.0103F$ | 1.592 | 58.3 |
| (II) | $R_3 = +0.2079F$<br>$R_4 = +0.1363F$ | $t_2 = 0.0165F$<br>$S_2 = 0.0674F$<br>$S_3 = 0.0674F$ | 1.667 | 33.0 |
| (III) | $R_5 = -0.1363F$<br>$R_6 = -0.2079F$ | $t_3 = 0.0165F$<br>$S_4 = 0.0103F$ | 1.667 | 33.0 |
| (VI) | $R_7 = -0.4658F$<br>$R_8 = -0.2003F$ | $t_4 = 0.0752F$ | 1.592 | 58.3 |

13. The optical objective of claim 1 having the following constructional characteristics:

| Lens | Radii | Spaces and Thicknesses | $n_d$ | $V_d$ |
|---|---|---|---|---|
| (I) | $R_1 = +0.2014F$<br>$R_2 = +0.4331F$ | $t_1 = 0.0656F$<br>$S_1 = 0.0104F$ | 1.607 | 56.7 |
| (II) | $R_3 = +0.2028F$<br>$R_4 = +0.1375F$ | $t_2 = 0.0186F$<br>$S_2 = 0.0739F$<br>$S_3 = 0.0739F$ | 1.689 | 31.2 |
| (III) | $R_5 = -0.1375F$<br>$R_6 = -0.2028F$ | $t_3 = 0.0186F$<br>$S_4 = 0.0104F$ | 1.689 | 31.2 |
| (IV) | $R_7 = -0.4331F$<br>$R_8 = -0.2014F$ | $t_4 = 0.0656F$ | 1.607 | 56.7 |

14. The optical objective of claim 1 having the following constructional characteristics:

| Lens | Radii | Spaces and Thicknesses | $n_d$ | $V_d$ |
|---|---|---|---|---|
| (I) | $R_1 = +0.2013F$<br>$R_2 = +0.4321F$ | $t_1 = 0.0676F$<br>$S_1 = 0.0104F$ | 1.622 | 53.2 |
| (II) | $R_3 = -0.2046F$<br>$R_4 = +0.1380F$ | $t_2 = 0.0159F$<br>$S_2 = 0.0716F$<br>$S_3 = 0.0716F$ | 1.699 | 30.1 |
| (III) | $R_5 = -0.1380F$<br>$R_6 = -0.2046F$ | $t_3 = 0.0159F$<br>$S_4 = 0.0104F$ | 1.699 | 30.1 |
| (IV) | $R_7 = -0.4321F$<br>$R_8 = -0.2013F$ | $t_4 = 0.0676F$ | 1.622 | 53.2 |

15. The optical objective of claim 1 having the following constructional characteristics:

| Lens | Radii | Spaces and Thicknesses | $n_d$ | $V_d$ |
|---|---|---|---|---|
| (I) | $R_1=+0.2000F$ | $t_1=0.0768F$ | 1.607 | 56.7 |
|  | $R_2=+0.4468F$ | $S_1=0.0084F$ |  |  |
| (II) | $R_3=+0.2068F$ | $t_2=0.0150F$ | 1.673 | 32.2 |
|  | $R_4=+0.1359F$ | $S_2=0.0686F$ |  |  |
|  |  | $S_3=0.0686F$ |  |  |
| (III) | $R_5=-0.1359F$ | $t_3=0.0150F$ | 1.673 | 32.2 |
|  | $R_6=-0.2061F$ | $S_4=0.0084F$ |  |  |
| (IV) | $R_7=-0.4468F$ | $t_4=0.0768F$ | 1.607 | 56.7 |
|  | $R_8=-0.2000F$ |  |  |  |

16. The optical objective of claim 1 having the following constructional characteristics:

| Lens | Radii | Spaces and Thicknesses | $n_d$ | $V_d$ |
|---|---|---|---|---|
| (I) | $R_1=+0.1976F$ | $t_1=0.0861F$ | 1.517 | 64.2 |
|  | $R_2=+0.6439F$ | $S_1=0.0100F$ |  |  |
| (II) | $R_3=+0.2196F$ | $t_2=0.0240F$ | 1.620 | 36.4 |
|  | $R_4=+0.1325F$ | $S_2=0.0558F$ |  |  |
|  |  | $S_3=0.0558F$ |  |  |
| (III) | $R_5=-0.1325F$ | $t_3=0.0240F$ | 1.620 | 36.4 |
|  | $R_6=-0.2196F$ | $S_4=0.0100F$ |  |  |
| (IV) | $R_7=-0.6439F$ | $t_4=0.0861F$ | 1.517 | 64.2 |
|  | $R_8=-0.1976F$ |  |  |  |

17. The optical objective of claim 1 having the following constructional characteristics:

| Lens | Radii | Spaces and Thicknesses | $n_d$ | $V_d$ |
|---|---|---|---|---|
| (I) | $R_1=+0.1995F$ | $t_1=0.0869F$ | 1.522 | 59.5 |
|  | $R_2=+1.011F$ | $S_1=0.0101F$ |  |  |
| (II) | $R_3=+0.2501F$ | $t_2=0.0236F$ | 1.620 | 36.4 |
|  | $R_4=+0.1337F$ | $S_2=0.0437F$ |  |  |
|  |  | $S_3=0.0437F$ |  |  |
| (III) | $R_5=-0.1337F$ | $t_3=0.0236F$ | 1.620 | 36.4 |
|  | $R_6=-0.2501F$ | $S_4=0.0101F$ |  |  |
| (IV) | $R_7=-1.011F$ | $t_4=0.0869F$ | 1.522 | 59.5 |
|  | $R_8=-0.1995F$ |  |  |  |

18. The optical objective of claim 1 having the following constructional characteristics:

| Lens | Radii | Spaces and Thicknesses | $n_d$ | $V_d$ |
|---|---|---|---|---|
| (I) | $R_1=+0.1992F$ | $t_1=0.0942F$ | 1.564 | 60.8 |
|  | $R_2=+0.5810F$ | $S_1=0.0101F$ |  |  |
| (II) | $R_3=+0.2238F$ | $t_2=0.0119F$ | 1.620 | 36.4 |
|  | $R_4=+0.1342F$ | $S_2=0.0556F$ |  |  |
|  |  | $S_3=0.0556F$ |  |  |
| (III) | $R_5=-0.1342F$ | $t_3=0.0119F$ | 1.620 | 36.4 |
|  | $R_6=-0.2238F$ | $S_4=0.0101F$ |  |  |
| (IV) | $R_7=-0.5810F$ | $t_4=0.0942F$ | 1.564 | 60.8 |
|  | $R_8=-0.1992F$ |  |  |  |

19. The optical objective of claim 1 having the following constructional characteristics:

| Lens | Radii | Spaces and Thicknesses | $n_d$ | $V_d$ |
|---|---|---|---|---|
| (I) | $R_1=+0.2027F$ | $t_1=0.0920F$ | 1.569 | 56.1 |
|  | $R_2=+1.007F$ | $S_1=0.0103F$ |  |  |
| (II) | $R_3=+0.2692F$ | $t_2=0.0130F$ | 1.620 | 36.4 |
|  | $R_4=+0.1366F$ | $S_2=0.0420F$ |  |  |
|  |  | $S_3=0.0420F$ |  |  |
| (III) | $R_5=-0.1366F$ | $t_3=0.0130F$ | 1.620 | 36.4 |
|  | $R_6=-0.2692F$ | $S_4=0.0103F$ |  |  |
| (IV) | $R_7=-1.007F$ | $t_4=0.0902F$ | 1.569 | 56.1 |
|  | $R_8=-0.2027F$ |  |  |  |

References Cited

UNITED STATES PATENTS 3,449,040   6/1969   Ruben.

DAVID SCHONBERG, Primary Examiner

P. A. SACHER, Assistant Examiner